(12) United States Patent
Kawada et al.

(10) Patent No.: US 6,381,528 B1
(45) Date of Patent: Apr. 30, 2002

(54) CONTROL UNIT FOR ELECTRIC POWER STEERING APPARATUS

(75) Inventors: Hideaki Kawada; Yusuke Itakura; Toru Sakaguchi, all of Gumma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/928,427

(22) Filed: Aug. 14, 2001

(30) Foreign Application Priority Data

Aug. 14, 2000 (JP) ........................................ 2000-245484

(51) Int. Cl.[7] ................................................ G06F 7/00
(52) U.S. Cl. ........................................ 701/41; 180/443
(58) Field of Search ........................... 701/41, 42, 36, 701/1; 180/410, 443, 446; 318/560, 628

(56) References Cited

U.S. PATENT DOCUMENTS

| | | | | |
|---|---|---|---|---|
| 5,927,430 A | * | 7/1999 | Makai et al. | ................ 180/446 |
| 6,041,884 A | * | 3/2000 | Shimizu et al. | .............. 180/443 |
| 6,170,600 B1 | * | 1/2001 | Shimizu | ....................... 180/446 |
| 6,178,365 B1 | * | 1/2001 | Kawagoe et al. | .............. 701/41 |
| 6,240,350 B1 | * | 5/2001 | Endo | ............................ 701/41 |

FOREIGN PATENT DOCUMENTS

| | | | | |
|---|---|---|---|---|
| JP | 5-112251 | 5/1993 | ............ | B62D/6/02 |
| JP | 5-213208 | 8/1993 | ............ | B26D/5/04 |
| JP | 10-109655 | 4/1998 | ............ | B62D/5/04 |
| JP | 10-338152 | 12/1998 | ............ | B62D/5/04 |

* cited by examiner

Primary Examiner—Richard M. Camby
(74) Attorney, Agent, or Firm—Sughrue Mion, PLLC

(57) ABSTRACT

There is provided a control unit for an electric power steering apparatus that controls a motor for giving steering assist force to a steering mechanism, based on a current control value calculated from a steering assist command value calculated based on the steering torque generated in the steering shaft, and a current value of the motor. The control unit has a first controller and a second controller for controlling the motor. Based on a current command value calculated by the second controller, the second controller monitors the first controller that controls the driving of the motor based on the steering assist command value calculated by the first controller. When the first controller is in a status not controlling the steering assist command value, the function of the second controller for monitoring the first controller is limited.

10 Claims, 10 Drawing Sheets

CONTROL UNIT FOR ELECTRIC POWER STEERING APPARATUS

BACKGROUND OF THE INVENTION

1. Field of the Invention

The present invention relates to a control unit for an electric power steering apparatus that provides steering assist force by a motor to the steering system of an automobile or a vehicle. The present invention particularly relates to a control unit for an electric power steering apparatus that is equipped with two controllers of a main and a sub (CPU (Central Processing Unit) or MCU (Micro Controller Unit)) for controlling a motor of a large inertia using a digital servo, the one controller for controlling the motor, and the other for monitoring an abnormality of a driving system, to have improved controllability and safety.

2. Description of the Related Art

An electric power steering apparatus for applying assist load to the steering apparatus of an automobile or a vehicle using turning effort of a motor applies the driving force of the motor to a steering shaft or a rack axis based on a transmission mechanism like gears or belts via a reduction mechanism. Such a conventional electric power steering apparatus carries out a feedback control of a motor current for accurately generating an assist torque (a steering assist torque). The feedback control is for adjusting a motor application voltage so as to minimize a difference between a current control value and a motor current detection value. The motor application voltage is generally adjusted based on a duty ratio of a PWM (Pulse Width Modulation) control.

A general structure of an electric power steering apparatus will be explained with reference to FIG. 1. A shaft 2 of a steering wheel 1 is connected to a tie rod 6 of running wheels through reduction gears 3, universal joints 4a and 4b and a pinion rack mechanism 5. The shaft 2 is provided with a torque sensor 10 for detecting a steering torque of the steering wheel 1. A motor 20 for assisting the steering force of the steering wheel 1 is connected to the shaft 2 through a clutch 21 and the reduction gears 3. A control unit 30 for controlling the power steering apparatus is supplied with power from a battery 14 through an ignition key 11 and a relay 13. The control unit 30 calculates a steering assist command value I of an assist command based on a steering torque T detected by the torque sensor 10 and a vehicle speed V detected by a vehicle speed sensor 12. The control unit 30 then controls a current to be supplied to the motor 20 based on the calculated steering assist command value I. The clutch 21 is ON/OFF-controlled by the control unit 30, and is kept ON (connected) in an ordinary operation status. When the control unit 30 has decided that the power steering apparatus is in failure, and also when the power source (voltage Vb) of the battery 14 has been turned OFF with the ignition key 11 and the relay 13, the clutch 21 is turned OFF (disconnected).

The control unit 30 is mainly composed of a CPU. FIG. 2 shows general functions to be executed based on a program inside the CPU. Functions and operation of the control unit 30 will be explained below.

A steering torque T detected by the torque sensor 10 and then input is phase-compensated by the phase compensator 31 for increasing the stability of the steering system. The phase-compensated steering torque TA is inputted to a steering assist command value calculator 32. A vehicle speed V detected by the vehicle speed sensor 12 is also inputted to the steering assist command value calculator 32. The steering assist command value calculator 32 calculates a steering assist command value I as a control target value of a current to be supplied to the motor 20, based on the inputted steering torque TA and the inputted vehicle speed V. The steering assist command value I is inputted to a subtractor 30A, and is also inputted to a differential compensator 34 of a feedforward system for increasing a response speed.

A difference (I−i) calculated by the subtractor 30A is inputted to a proportional calculator 35. A proportional output from the proportional calculator 35 is inputted to an adder 30B, and is also inputted to an integration calculator 36 for improving the characteristic of the feedback system. Outputs from the differential compensator 34 and the integration calculator 36 are also inputted to the adder 30B, and are added together by the adder 30B. A result of the addition by the adder 30B is obtained as a current command value E, and this is inputted to a motor driving circuit 37 as a motor driving signal. A motor current value i of the motor 20 is detected by a motor current detecting circuit 38, and this motor current value i is inputted to the subtractor 30A and is fed back.

As explained above, conventionally, one CPU has calculated the current command value based on the torque signal (the steering torque T) and the current detection value i. The CPU then has controlled the driving of the motor based on the current command value. In this case, a signal in the steering torque direction is generated to the determined motor current driving direction, based on the torque signal using hard logic or other CPU. Only when the signal in the steering torque direction coincides with the motor driving direction, the motor is driven. In the case of detecting an abnormality of the motor driving system, the time taken from a detection to a fixing of an abnormality is constant, and this has not always been accurate.

Further, conventionally, one CPU is provided with an external WDT (Watch Dog Timer), and the CPU inputs a clear pulse to the WDT to monitor a runaway of the CPU. When a clear pulse has not been inputted within a predetermined time, a reset signal is outputted to the CPU from the DWT, thereby to restart the CPU. Further, when the system uses two CPUs, the two CPUs mutually output pulses of predetermined periods, and mutually monitor the periods of the pulses, thereby to monitor a runaway of the other CPU.

According to the above electric power steering apparatus, the inertia of the motor becomes large along with an increase in the output of the motor. Thus, in order to secure the steering characteristic, it has become necessary to compensate for the inertia of the motor. Because of the control of compensating for the inertia, the direction of the torque signal has come not to coincide with the actual driving direction of the motor, unlike the conventional practice. As a result, in spite of the fact that the control of the inertia compensation function operates normally, the other controller outputs a torque direction signal based on the torque signal, and there occurs the inconvenience that the motor driving is stopped temporarily. In other words, the direction interlocking based on the direction of the steering torque that has been practiced conventionally has become not adaptable to the actual system.

Further, conventionally, in the case of detecting an abnormality of the motor driving system, the time taken from a detection of an abnormality to a fixing of the abnormality has been constant. However, in the case of detecting an abnormality by obtaining a difference between a current command value and a motor current detection value, it is considered that the existence of a large difference is clearly abnormal. In this case, it is necessary to quickly stop the system. When a small difference has been detected, an erroneous detection due to the influence of noise or the like is considered. In this case, it is necessary to take time for fixing the abnormality.

Further, according to the conventional practice of monitoring a runaway of the CPU by using an external WDT, the CPU generates a runaway when a program does not operate normally, and the CPU is restarted based on a reset signal from the WDT. However, in the case of a failure that the program generates a runway at the same place again, the output status and the stop status of the motor are generated alternately. This has brought about a dangerous status to the driver.

When the system has two controllers, and one controller (a first controller) carries out a control and the other controller (a second controller) monitors the control, the two controllers need to mutually monitor a runaway of the CPUs in order to confirm that the monitoring controller is operating normally (for example, Japanese Patent Application Laid-Open No. 5-213208 A). When the system has two CPUs, and the two CPUs mutually transmit/receive pulse signals to monitor a runaway of the other CPU, there have been the following problems. The program itself does not operate normally, and continues outputting only a monitoring pulse, with a result that it is not possible to detect a runaway. A pulse signal that has been generated normally based on an electromagnetic wave or noise is measured erroneously, and is detected erroneously.

Further, when the first controller is halted, or when the current command value is being limited based on the operation of the protection function, the second controller may misjudge that the control operation of the first controller is abnormal. Even when the first controller does not carry out an initial diagnosis or assist, a motor current may flow depending on a runway of the CPU. Depending on the motor current volume, a self-steering may occur that the steering is carried out automatically without control. Further, a current may flow within the motor driving circuit, depending on a failure of the driving circuit.

SUMMARY OF THE INVENTION

The present invention has been made in the light of the above situation. It is, therefore, an object of the present invention to provide a control unit for an electric power steering apparatus that is equipped with two controllers of a main and a sub (CPU or MCU) for controlling a motor of a large inertia, the one controller for controlling the power steering, and the other for monitoring the control operation, to have improved controllability and safety.

In order to meet the above object, according to one aspect of the present invention, there is provided a control unit for an electric power steering apparatus that controls a motor for giving steering assist force to a steering mechanism, based on a current command value calculated from a steering assist command value calculated based on the steering torque generated in the steering shaft, and a current detection value of the motor. Particularly, the control unit has a first controller and a second controller for controlling the motor. Based on a current command value calculated by the second controller, the second controller monitors the first controller that controls the driving of the motor based on the steering assist command value calculated by the first controller. When the first controller is in a status not controlling the steering assist command value, the function of the second controller for monitoring the first controller is limited.

According to another aspect of the present invention, there is provided a control unit for an electric power steering apparatus that controls a motor for giving steering assist force to a steering mechanism, based on a current command value calculated from a steering assist command value calculated based on the steering torque generated in the steering shaft, and a current detection value of the motor. Particularly, the control unit has a first controller and a second controller for controlling the motor. Based on a current command value calculated by the second controller, the second controller monitors the first controller that controls the driving of the motor based on the steering assist command value calculated by the first controller. When the first controller is in a status of limiting the current command value based on an own self-protection function, the function of the second controller for monitoring the first controller is limited.

DETAILED DESCRIPTION OF THE PREFERRED EMBODIMENTS

According to the present invention, two controllers comprising CPUs or MCUs are provided as a control unit for an electric power steering apparatus. Each controller is inputted with at least a torque signal, a vehicle speed signal, an engine rotation signal, a motor current detection value and a motor terminal voltage. A motor is controlled based on a motor current command value calculated by the first controller. It is decided whether the motor current command value calculated by the first controller is normal or not, based on a difference between a motor current command value calculated by the second controller and a motor current detection value. In a status that the first controller is not calculating a steering assist command value, or in a status that the first controller is limiting a current command value based on an own protection function, the monitoring of the first controller by the second controller is not stopped, and the monitoring function of the second controller is limited and monitored. The monitoring function of the second controller is limited to protect the second controller from making an erroneous detection when the first controller is halted. Further, each controller is provided with a WDT for monitoring by itself and a WDT for monitoring the other controller. Each controller detects a runaway of the other controller by transmitting/receiving communication commands to/from the other controller.

Embodiments of the present invention will be explained in detail below with reference to the drawings.

Figure 1:
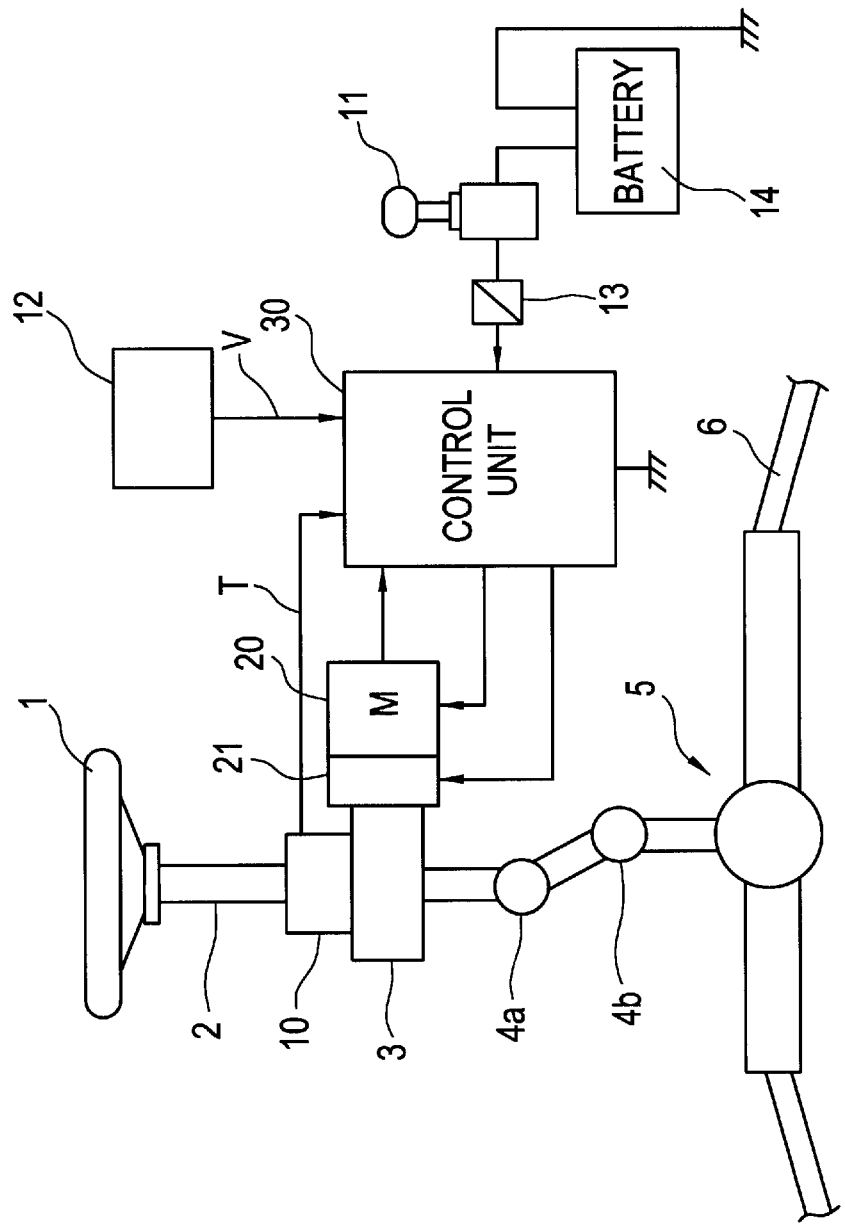
FIG. 1 is a structure diagram showing a schematic structure of an electric power steering apparatus.
Figure 2:
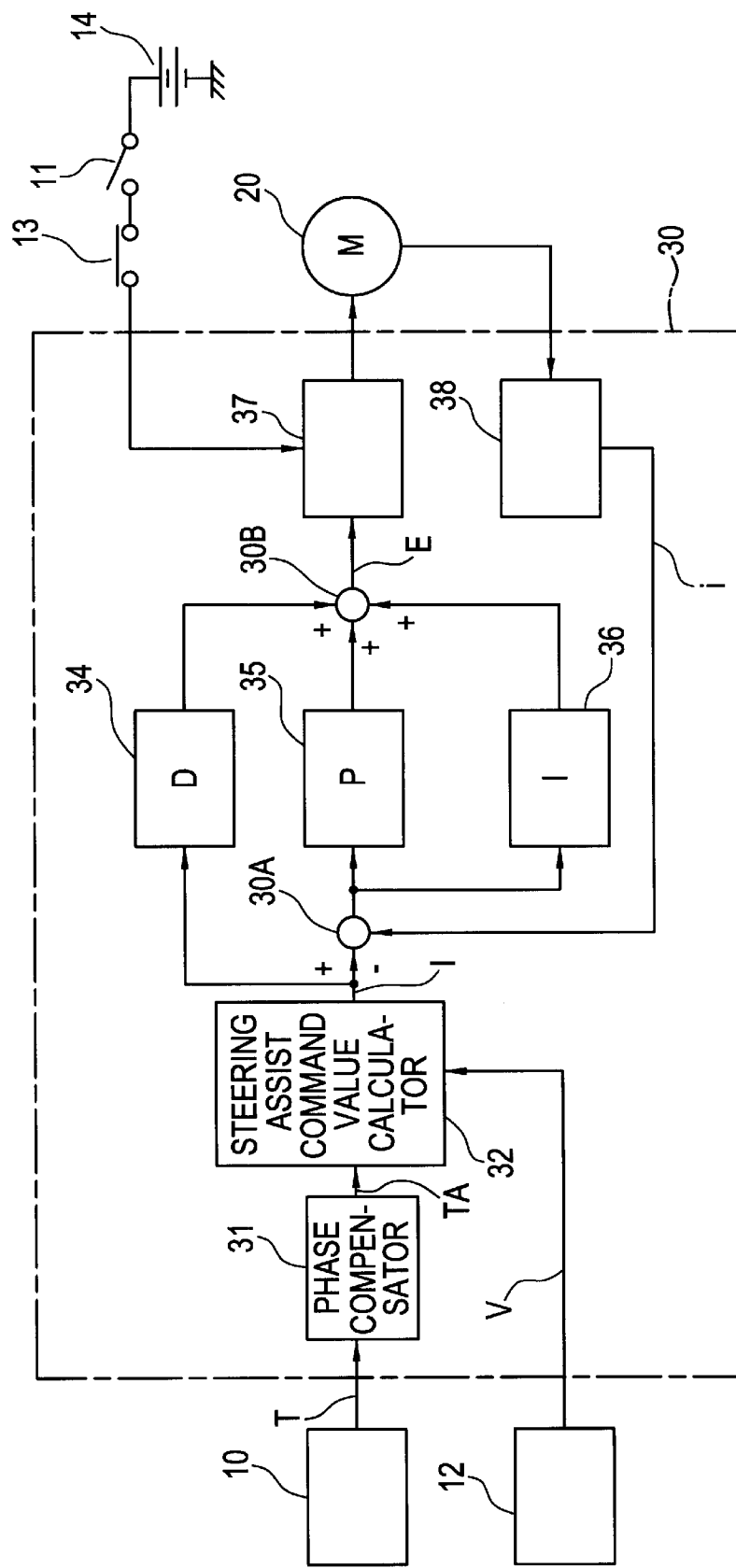
FIG. 2 is a block structure diagram showing an example of a control unit for an electric power steering apparatus.
Figure 3:
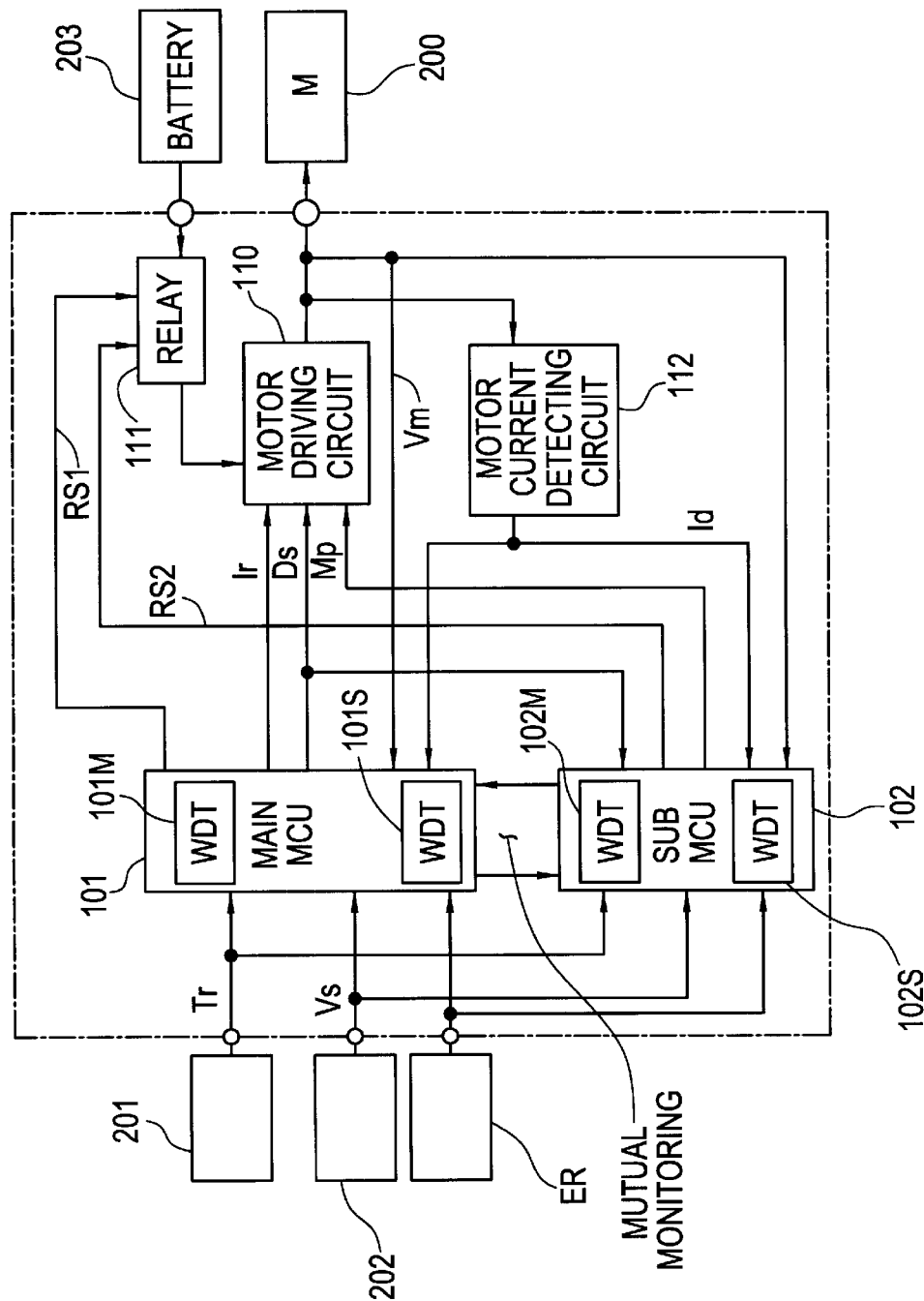
FIG. 3 is a block diagram showing a structure of one embodiment of the present invention.

FIG. 3 is a block diagram showing an embodiment of the present invention. A torque signal Tr from a torque sensor 201 and a vehicle speed Vs and an engine rotation speed ER from a vehicle speed sensor 202 are inputted to a main MCU 101 and a sub MCU 102, respectively. A motor driving signal Ir calculated by the main MCU 101 is inputted to a motor driving circuit 110. The motor driving circuit 110 drives a motor 200 based on the motor driving signal Ir. The sub MCU 102 decides a motor driving direction of a current command value calculated by the MCU 102 by itself, and inputs a motor driving direction signal Ds that the main MCU 101 has outputted to the motor driving circuit 110. The sub MCU 102 compares both directions, and decides whether the main MCU 101 has calculated the motor driving direction signal Ds correctly or not.

The main MCU 101 has a WDT 101S for monitoring the sub MCU, and a WDT 101M for monitoring the self main MCU. The sub MCU 102 also has a WDT 102M for monitoring the main MCU, and a WDT 102S for monitoring the self sub MCU. A relay 111 for turning ON/OFF the input to batteries 203 is ON/OFF-controlled based on a relay ON/OFF signal RS1 outputted from the main MCU 101 and a relay ON/OFF signal RS2 outputted from the sub MCU 102. A current from the motor 200 is detected by a motor current detecting circuit 112. A current detection value Id and a motor terminal voltage Vm are inputted to the main MCU 101 and the sub MCU 102. A motor drive prohibiting signal Mp outputted from the sub MCU 102 is inputted to the motor driving circuit 110.

Each of the main MCU 101 and the sub MCU 102 generates the motor driving signal (the current command value) Ir based on the torque signal Tr, the vehicle speed Vs, the engine rotation signal ER, the current detection value Id and the motor terminal voltage Vm. Only the motor driving signal (the current command value) Ir from the main MCU 101 is inputted to the motor driving circuit 110. The current command value Ir calculated by the sub MCU 102 is used for the monitoring.

Figure 4A:
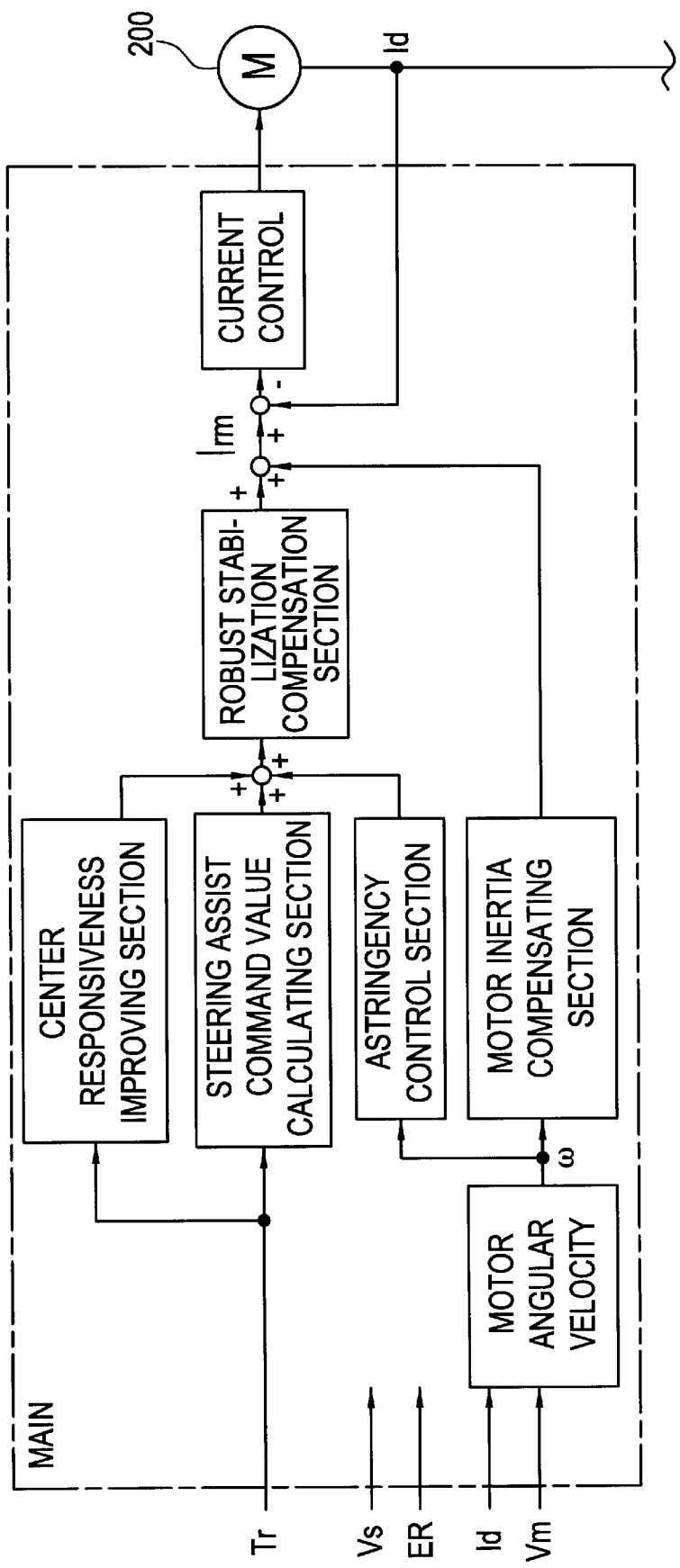
FIG. 4 is a block diagram showing an example of a functional structure of a current command calculating section in a controller according to the present invention.
Figure 4B:
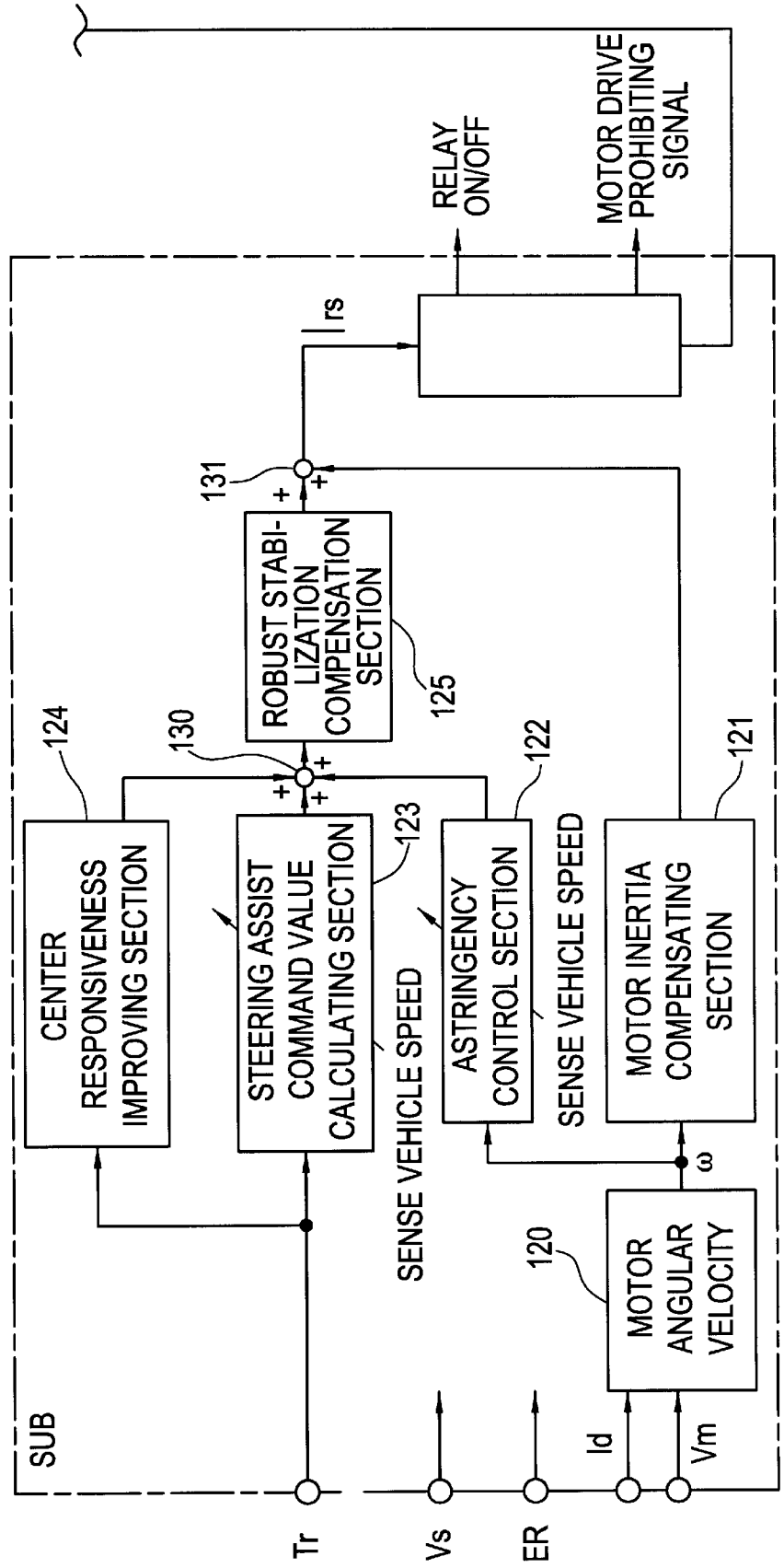

The main MCU 101 and the sub MCU 102 have functional structures as shown in FIG. 4. Each of the main MCU 101 and the sub MCU 102 calculates the current command value Ir, based on the torque signal Tr, the vehicle speed Vs, the engine rotation signal ER, the motor current detection value Id and the motor terminal voltage Vm. Each of the main MCU 101 and the sub MCU 102 comprises a motor angular velocity estimating section 120, a motor inertia compensating section 121, an astringency control section 122, a steering assist command value calculating section 123, a center responsiveness improving section 124, a robust stabilization compensation section 125 and adders 130 and 131. The motor angular velocity estimating section 120 calculates a counter-electromotive force of the motor 200 based on the motor current detection value Id and the motor terminal voltage Vm, and estimates a motor angular velocity ω from the counter-electromotive force. The estimated motor angular velocity ω is inputted to the motor inertia compensating section 121 and the astringency control section 122. An output of the motor inertia compensating section 121 is inputted to the adder 131. An output of the astringency control section 122 is inputted to the adder 130. The steering assist command value calculating section 123 calculates a value that becomes a basis of the motor current command value Ir based on the torque signal Tr. The center responsiveness improving section 124 also calculates a value that becomes a basis of the motor current command value Ir based on the torque signal Tr. Both added values are inputted to the adder 130.

An added value obtained from the adder 130 is inputted to the robust stabilization compensation section 125. An output of the robust stabilization compensation section 125 is inputted to the adder 131. An added value obtained from the adder 131 becomes the motor current command value Ir. The astringency control section 122 and the steering assist command value calculating section 123 use the vehicle speed signal Vs as a parameter. The astringency control section 122 applies braking to the oscillation of the steering wheel in order to improve the astringency of the yaw of the vehicle. The motor inertia compensating section 121 compensates for the inertia and the friction of the motor 200. The center responsiveness improving section 124 increases the responsiveness of the control near the neutral point of the steering, and realizes soft and smooth steering. The robust stabilization compensation section 125 is a compensating section disclosed in Japanese Patent Application Laid-Open No. 8-290778 A. This compensation section has a characteristic expression $G(s)=(s^2+a1 \cdot s+a2)/(s^2+b1 \cdot s+b2)$, where "s" represents a Laplace operator. The compensation section removes a peak value of a resonance frequency of a resonance system that comprises an inertia element and a spring element included in a detection torque. Based on this, the compensating section compensates for a deviation in the phase of the resonance frequency that hinders the stability and the responsiveness of the control system. In the characteristic expression $G(s)$, a1, a2, b1 and b2 represent parameters that are determined based on the resonance frequency of the resonance system.

The motor angular velocity estimating section 120 may carry out the estimation of an angular velocity according to a method disclosed in Japanese Patent Application Laid-Open No. 10-109655 A. Alternatively, the motor angular velocity estimating section 120 may carry out the estimation of an angular velocity according to a method disclosed in Japanese Patent Application Laid-Open No. 10-338152 A of the present applicant. In other words, impedance models of the motor driving system are defined that are different between an intermittent mode and a continuous mode. With this arrangement, a motor angular velocity is estimated in consideration of the influence that the driving system gives to the driving system impedance. A motor angular velocity is estimated based on the following expressions (1) and (2), where Io represents a current value when the intermittent mode is switched to the continuous mode, and $K_T \cdot \omega$ represents an estimate value of a counter-electromotive force.

When I<Io, $$K_T \cdot \omega = Vm - R1 \cdot i \quad (1)$$

When I≧Io, $$K_T \cdot \omega Vm - (R2 \cdot i + b) \quad (2)$$

where R1 represents an impedance of the intermittent mode at a reference temperature, R2 represents an impedance of the continuous mode at a reference temperature, and b represents a constant.

Figure 5:
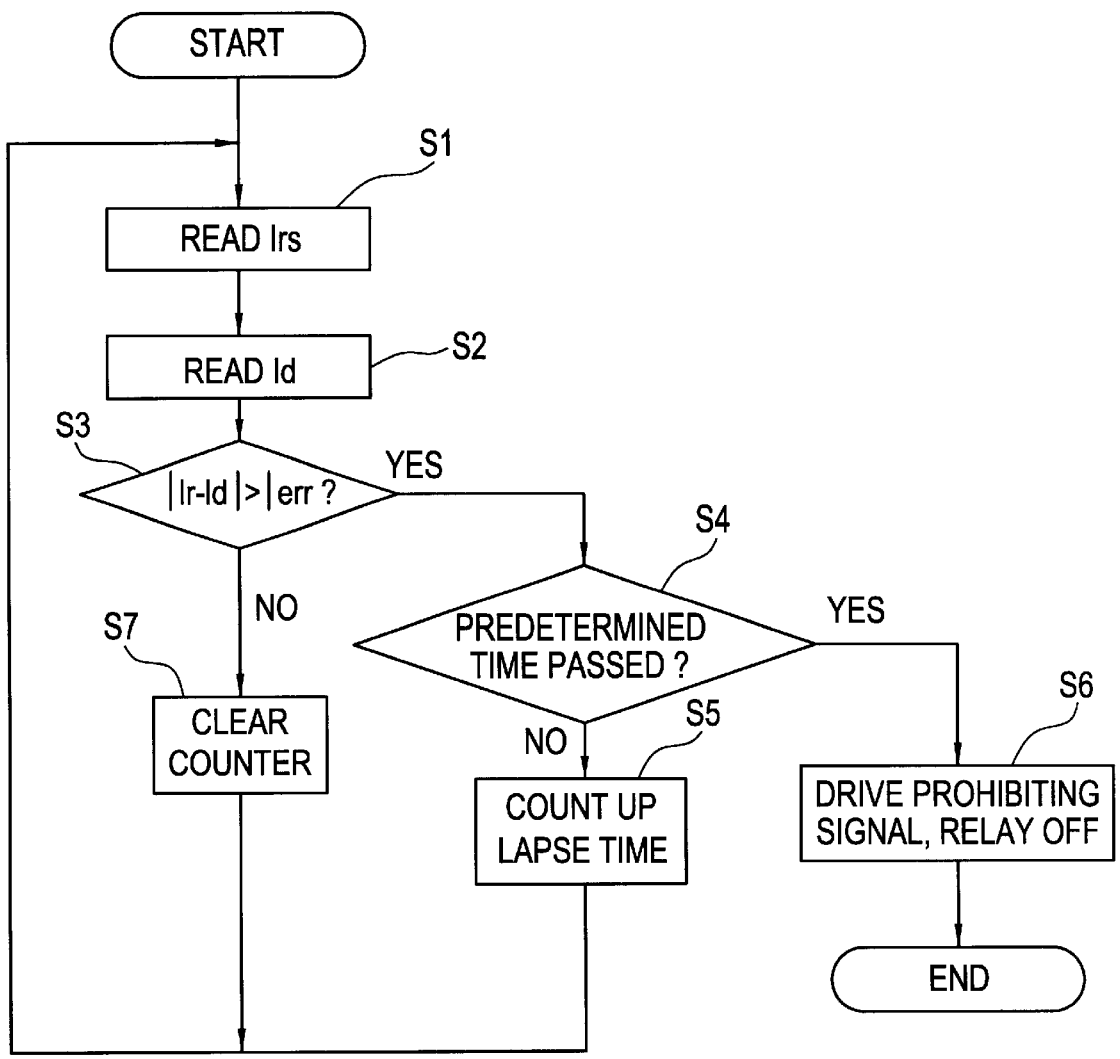
FIG. 5 is a flowchart showing an example of an operation (a current abnormality) of the present invention.

In the above structure, a status of a detection of a current calculation will be explained with reference to a flowchart shown in FIG. 5.

The sub MCU 102 reads a current command value Irs calculated by the sub MCU 102 (Step S1). Then, the sub MCU 102 reads a current detection value Id (Step S2), and decides whether an absolute value |Ir–Id| of a difference between these values is larger than a predetermined value Ierr or not (Step S3). When the absolute value of the difference is equal to or smaller than the predetermined value Ierr, the sub MCU 102 clears the counter (Step S7), and returns to the Step S1. When the absolute value of the difference is larger than the predetermined value Ierr, the sub MCU 102 judges whether a predetermined time has passed or not (Step S4). When the predetermined time has not passed yet, the sub MCU 102 counts up the lapse time (Step S5), and returns to the Step S1. When the predetermined time has passed, the sub MCU 102 prohibits a monitor driving signal, and stops the motor 200, and turns OFF the relay 111 (Step S6). In other words, the sub MCU 102 inputs a motor drive prohibiting signal Mp to the motor driving circuit 110, and stops the driving of the motor 200. At the same time, the sub MCU 102 inputs a relay ON/OFF signal RS2 to the relay 111, and interrupts the relay 111.

Figure 6:
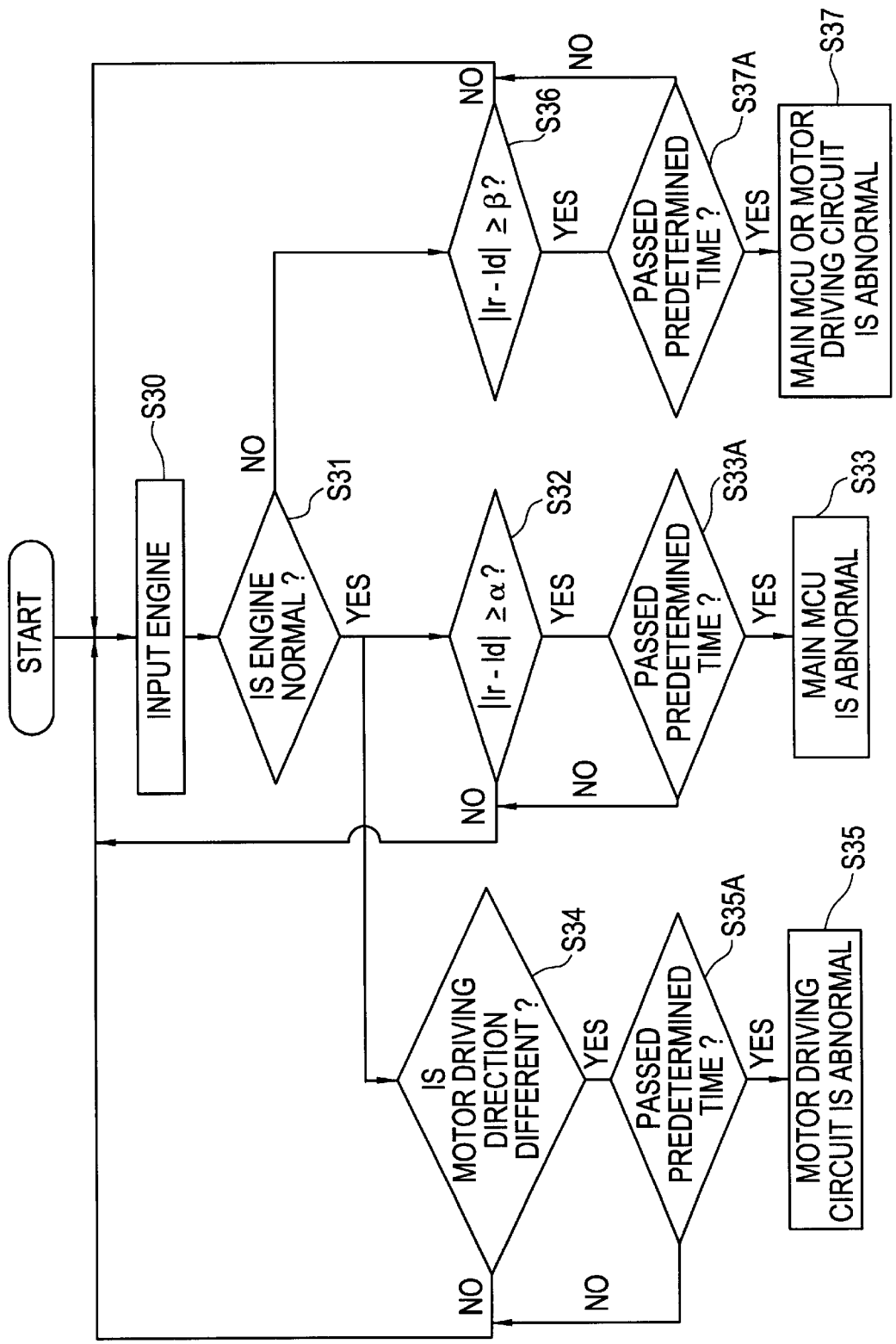
FIG. 6 is a flowchart showing an example of an operation (engine rotation abnormality) of the present invention.

Further, according to the present invention, the main MCU 101 and the sub MCU 102 input an engine rotation signal ER, to decide on an abnormality as shown in FIG. 6. Namely, each of the main MCU 101 and the sub MCU 102 inputs the engine rotation signal ER (Step S30), and decides that whether the engine rotation is normal or not (Step S31). When the engine rotation is not normal, each of the main MCU 101 and the sub MCU 102 decides whether the current detection value Id is larger than the current command value Ir calculated by the sub MCU 102 by a predetermined value β or not. In other words, each of the main MCU 101 and the sub MCU 102 decides whether a difference between the current detection value Id and the current command value Ir is equal to or larger than the predetermined value β or not (Step S36). When the difference is equal to or larger than the predetermined value β, each of the main MCU 101 and the sub MCU 102 decides whether a predetermined time has passed or not (Step S37A). When the predetermined time has passed, each of the main MCU 101 and the sub MCU 102 decides that either the main MCU 101 or the motor driving circuit 110 is abnormal (Step S37). When the difference between the current detection value Id and the current command value Ir is smaller than the predetermined value β at the Step S36, and also when the predetermined time has not passed at the Step S37A, the process returns to the Step S30 in each case.

When it has been decided at the Step S31 that the engine rotation is not abnormal, each of the main MCU 101 and the sub MCU 102 decides whether the difference between the current detection value Id and the current command value Ir is equal to or larger than a predetermined value α or not (Step S32). At the same time, each of the main MCU 101 and the sub MCU 102 decides whether a motor driving direction is different or not (Step S34). When the difference between the current detection value Id and the current command value Ir is equal to or larger than the predetermined value α, a decision is made whether a predetermined time has passed or not (Step S33A). When the predetermined time has passed, each of the main MCU 101 and the sub MCU 102 decides that the main MCU 101 is abnormal (Step S33). Similarly, when the motor driving direction is different, a decision is made whether a predetermined time has passed or not (Step S35A). When the predetermined time has passed, each of the main MCU 101 and the sub MCU 102 decides that the motor driving circuit 110 is abnormal (Step S35).

When the motor driving direction is the same at the Step S34, or when the difference between the current detection value Id and the current command value Ir is smaller than the predetermined value α at the Step S32, the process returns to the Step S30 in each case. When the predetermined time has not passed at the Step S33A and at the Step S35A, the process returns to the Step S30 in each case.

Figure 7:
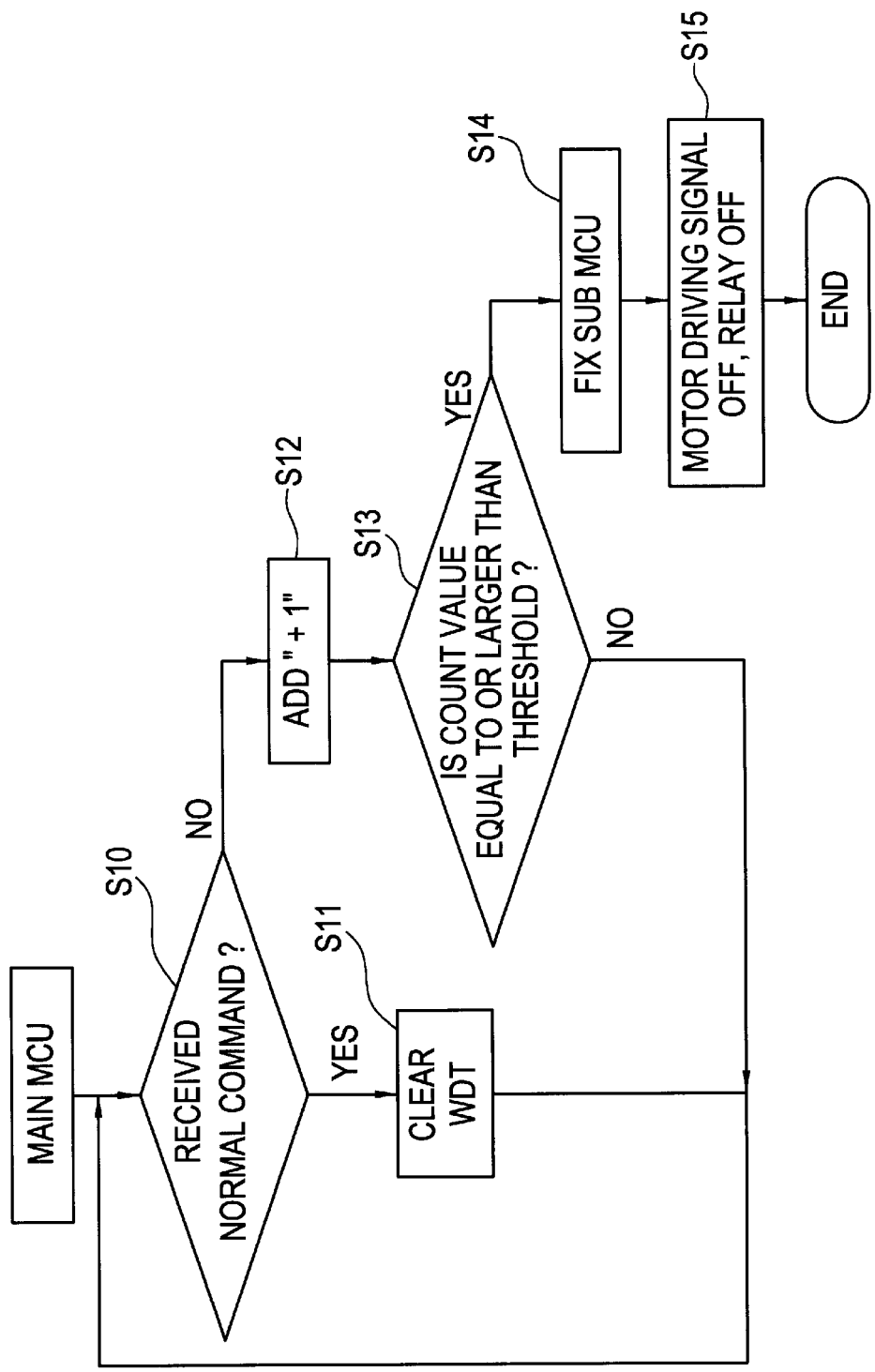
FIG. 7 is a flowchart showing an example of an operation of mutual monitoring of controllers according to the present invention.

In the mean time, the main MCU 101 and the sub MCU 102 are mutually monitoring the operation (a runaway) through serial communications. An example of this operation will be explained with reference to a flowchart shown in FIG. 7. While FIG. 7 shows the operation of the main MCU 101, the sub MCU 102 also carries out a similar operation.

The main MCU 101 decides whether the main MCU 101 has always received a normal command from the sub MCU 102 or not (Step S10). When the main MCU 101 has received a normal command, the main MCU 101 clears the incorporated WDT 101S for monitoring the sub MCU (Step S11), and returns to the waiting status. When a decision has been made at the Step S10 that a normal command has not been received, the main MCU 101 adds "+1" to the incorporated WDT 101S (Step S12), and decides whether the count value of the WDT 101S is equal to or larger than a predetermined threshold value or not (Step S13). When the count value is equal to or smaller than the predetermined threshold value, the process returns to the waiting status. When the count value has exceeded the predetermined threshold value, the main MCU 101 fixes the runaway of the sub MCU 102 (Step S14). At the same time, the main MCU 101 sets OFF the motor driving signal Ir, and turns OFF the relay 111 based on the relay ON/OFF signal RS1 (Step S15). When the sub MCU 102 has fixed a runaway, the motor driving signal Ir is not set to OFF, but the motor drive prohibiting signal Mp is outputted to stop the motor driving circuit 110, and the relay 111 is turned OFF based on the relay ON/OFF signal RS2. This is because the motor current command value Irs generated by the sub MCU 102 is for monitoring, and this is not supplied to the motor driving circuit 110.

When the MCU runaway detection time of the WDT for monitoring the self MCU is set equal to the MCU runaway detection time of the WDT for monitoring the other MCU, the following problem occurs. When the two MCUs generated a runaway substantially at the same time, both controllers operate temporarily normally after the WDT for monitoring the self MCU has restarted, and the WDT for monitoring the other MCU does not function. When a similar program runaway has occurred again, there is a risk that the WDT for monitoring the self MCU repeats the restarting. Therefore, according to the present invention, the MCU runaway detection time of the WDT for monitoring the main MCU is set different from the MCU runaway detection time of the WDT for monitoring the sub MCU. With this arrangement, it is possible to detect a runaway more securely.

Figure 8:
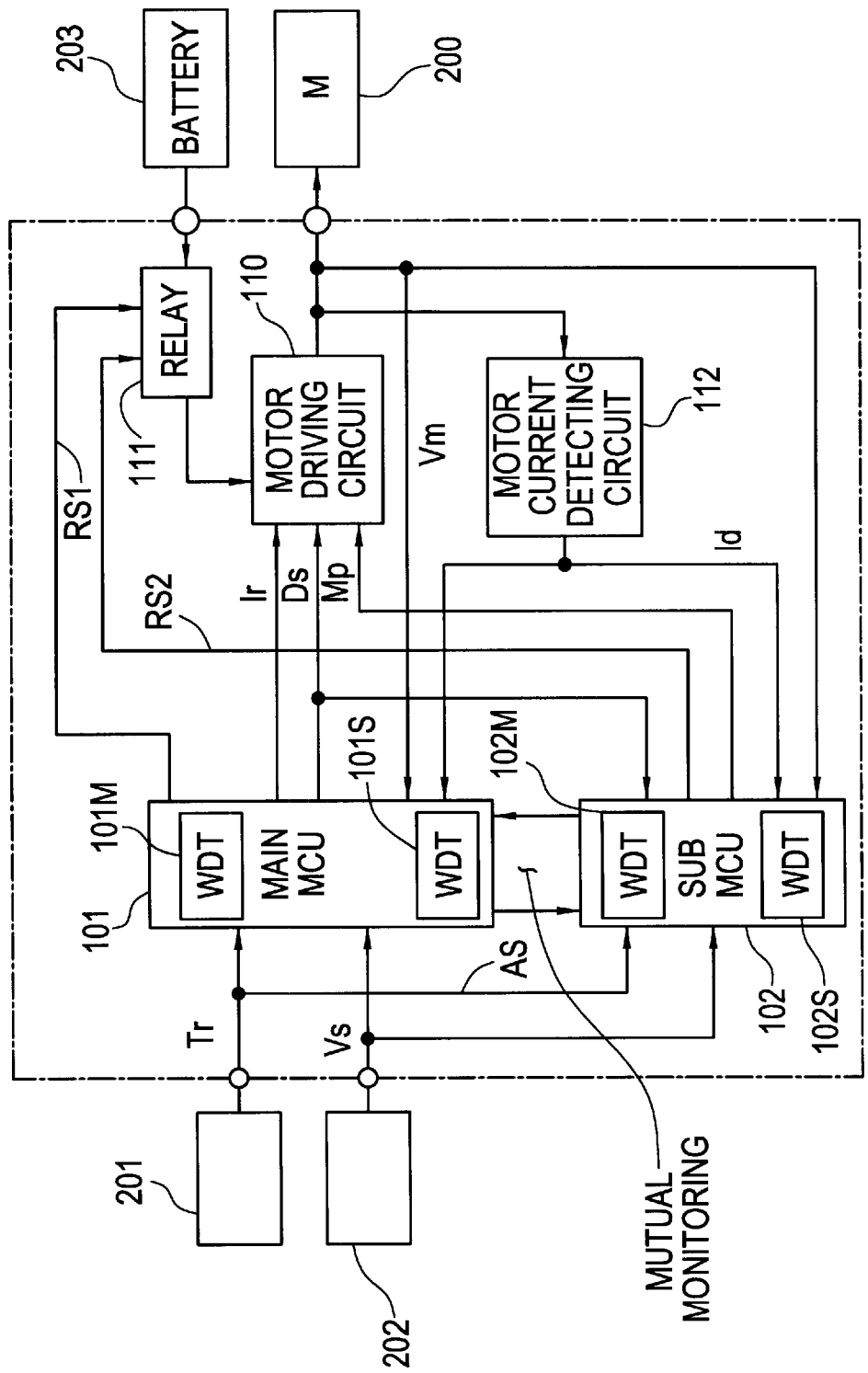
FIG. 8 is a block diagram showing a structure of another embodiment of the present invention.

FIG. 8 shows another embodiment of the present invention based on a layout corresponding to that of FIG. 3. A main MCU 101 inputs an assist stop signal AS to a sub MCU 102. When the main MCU 101 has posted an assist prohibiting status to the sub MCU 102 based on the assist stop signal AS, the sub MCU 102 decides that the main MCU 101 or the motor driving circuit is abnormal only when the current detection value is larger than the current command value calculated by the sub MCU 102 by a predetermined value. Further, when the main MCU 101 has posted an assist status to the sub MCU 102, the sub MCU 102 decides that the main MCU 101 or the motor driving circuit is abnormal when a difference between the current command value calculated by the sub MCU 102 and the current detection value is larger by a predetermined value, or when the motor driving signal is different. The main MCU 101 and the sub MCU 102 may communicate with each other using serial signals or using high/low signals by adding a new port signal.

Figure 9:
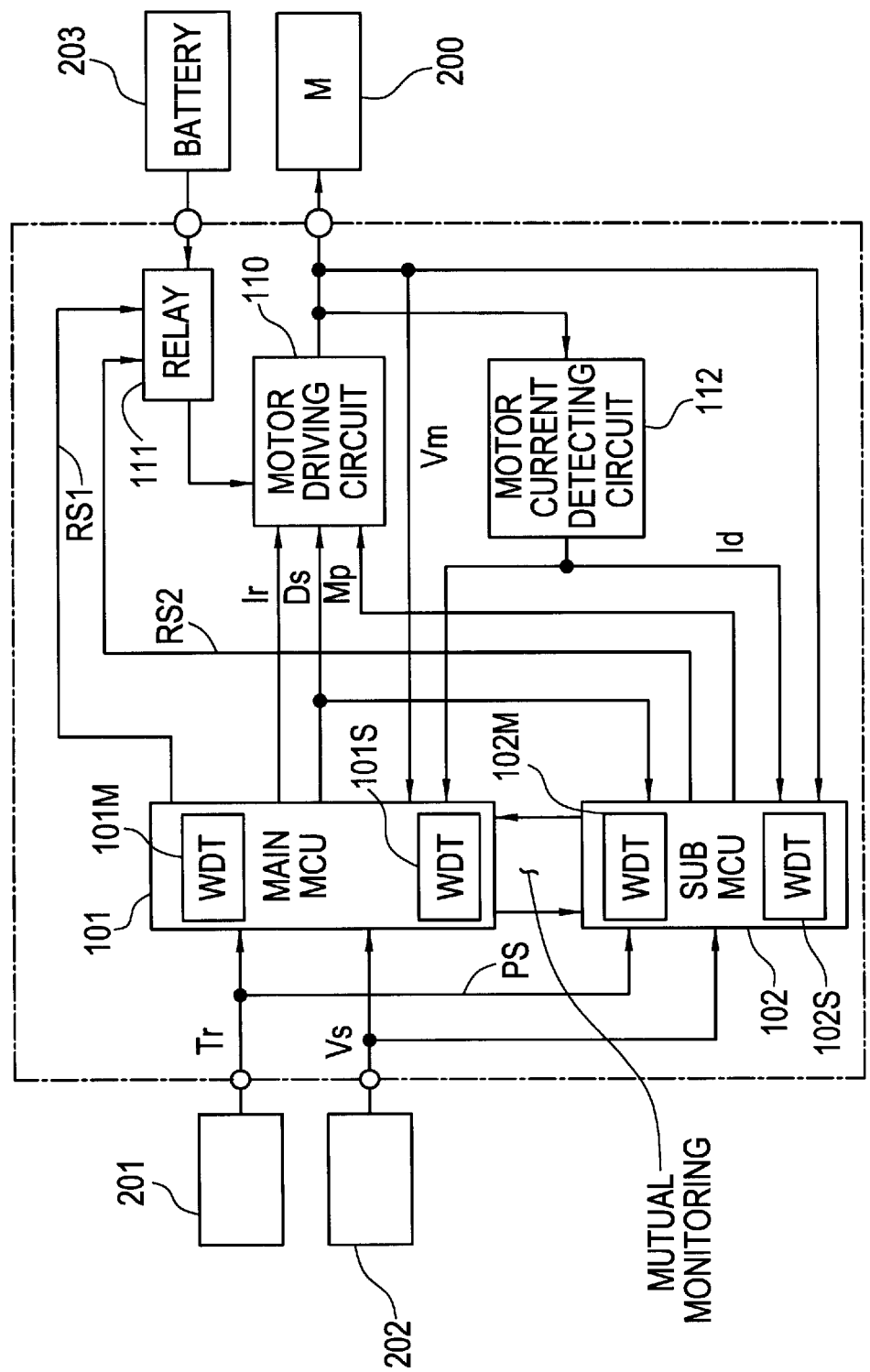
FIG. 9 is a block diagram showing a structure of still another embodiment of the present invention.

FIG. 9 shows still another embodiment of the present invention based on a layout corresponding to that of FIG. 3. A main MCU 101 inputs a protection operation signal PS to a sub MCU 102. When the main MCU 101 has detected by itself and has executed a protection operation, the sub MCU 102 decides that the main MCU 101 or the motor driving circuit is abnormal only when the current detection value is larger than the current command value calculated by the sub MCU 102 by a predetermined value. When the main MCU 101 has returned from the protection operation, the sub MCU 102 decides that the main MCU 101 or the motor driving circuit is abnormal when a difference between the current command value calculated by the sub MCU 102 and the current detection value is larger by a predetermined value, or when the motor driving signal is different. The main MCU 101 and the sub MCU 102 may communicate with each other using serial signals or using high/low signals by adding a new port signal.

The present invention can be applied not only to the column type or pinion type electric power steering apparatus, but also to the rack assist type electric power steering apparatus. Although the explanation has been made based on the MCUs, the same can similarly apply to the CPUs.

According to the present invention, the control unit for an electric power steering apparatus consists of two controllers (CPUs or MCUs). Each controller has a function of estimating a motor angular velocity. The first controller generates a current command value, and drives a motor, and the second controller also carries out a similar operation. The second controller compares the current command value calculated by the second controller with the motor current detection value controlled by the first controller. Further, an abnormality is detected based on an abnormality of the engine rotation, presence or absence of an assist stop, and presence or absence of protection operation. Therefore, the controllability and safety are improved more. Further, according to the present invention, the two controllers carry out mutual monitoring and a monitoring of the self MCU using WDTs incorporated in each MCU based on serial communications. Therefore, it is possible to prevent an occurrence of an accident due to a runaway of the CPUs.

What is claimed is:

1. A control unit for an electric power steering apparatus that controls a motor for giving steering assist force to a steering mechanism, based on a current command value calculated from a steering assist command value calculated based on the steering torque generated in the steering shaft, and a current detection value of the motor, the control unit comprising a first controller and a second controller for controlling the motor, wherein, based on a current command value calculated by the second controller, the second controller monitors the first controller that controls the driving of the motor based on the steering assist command value calculated by the first controller, and when the first controller is in a status not controlling the steering assist command value, the monitoring function of the second controller for the first controller is limited.

2. A control unit for an electric power steering apparatus according to claim 1, wherein said first controller and second controller input a torque signal, a vehicle speed signal and an engine revolution signal, said second controller decides a motor driving direction of a current command value calculated by said second controller by itself and inputs a motor driving direction signal outputted from said first controller, and said second controller decides whether said first controller has calculated the motor driving direction signal correctly or not.

3. A control unit for an electric power steering apparatus according to claim 2, wherein said first controller includes a first WDT for monitoring said second controller and a second WDT for monitoring itself, and said second controller includes a third WDT for monitoring said first controller and a forth WDT for monitoring itself.

4. A control unit for an electric power steering apparatus according to claim 3, wherein a current detecting signal and a motor terminal voltage are inputted to said first controller and said second controller, and a motor drive prohibiting signal outputted from second controller is inputted to a motor drive circuit.

5. A control unit for an electric power steering apparatus according to claim 1, wherein each of said first controller and said second controller generates said motor drive signal, and only motor drive signal from said first controller is inputted to a motor drive circuit and a current command value calculated by said second controller is used for monitoring.

6. A control unit for an electric power steering apparatus according to claim 1, wherein each of said first controller and said second controller includes a motor angular velocity estimating section, a motor inertia compensating section, an astringency control section, a steering assist command value calculating section, a center responsiveness improving section, a robust stabilization compensation section, said first controller has a current control section for driving said motor and second controller has a current abnormal monitoring section.

7. A control unit for an electric power steering apparatus according to claim 3, wherein a first out of control detection time of said first WDT and a second out of control detection time of said third WDT are different.

8. A control unit for an electric power steering apparatus according to claim 1, wherein an assist stop signal is inputted from said first controller to said second controller.

9. A control unit for an electric power steering apparatus according to claim 1, wherein a protection operation signal is inputted from said first controller to said second controller.

10. A control unit for an electric power steering apparatus that controls a motor for giving steering assist force to a steering mechanism, based on a current command value calculated from a steering assist command value calculated based on the steering torque generated in the steering shaft, and a current detection value of the motor, the control unit comprising a first controller and a second controller for controlling the motor, wherein, based on a current command value calculated by the second controller, the second controller monitors the first controller that controls the driving of the motor based on the steering assist command value calculated by the first controller, and when the first controller is in a status of limiting the current command value based on an own self-protection function, the function of the second controller for monitoring the first controller is limited.

* * * * *